Nov. 14, 1950  D. O. DRUGE  2,530,005
PRESSURE GAUGE
Filed March 29, 1946
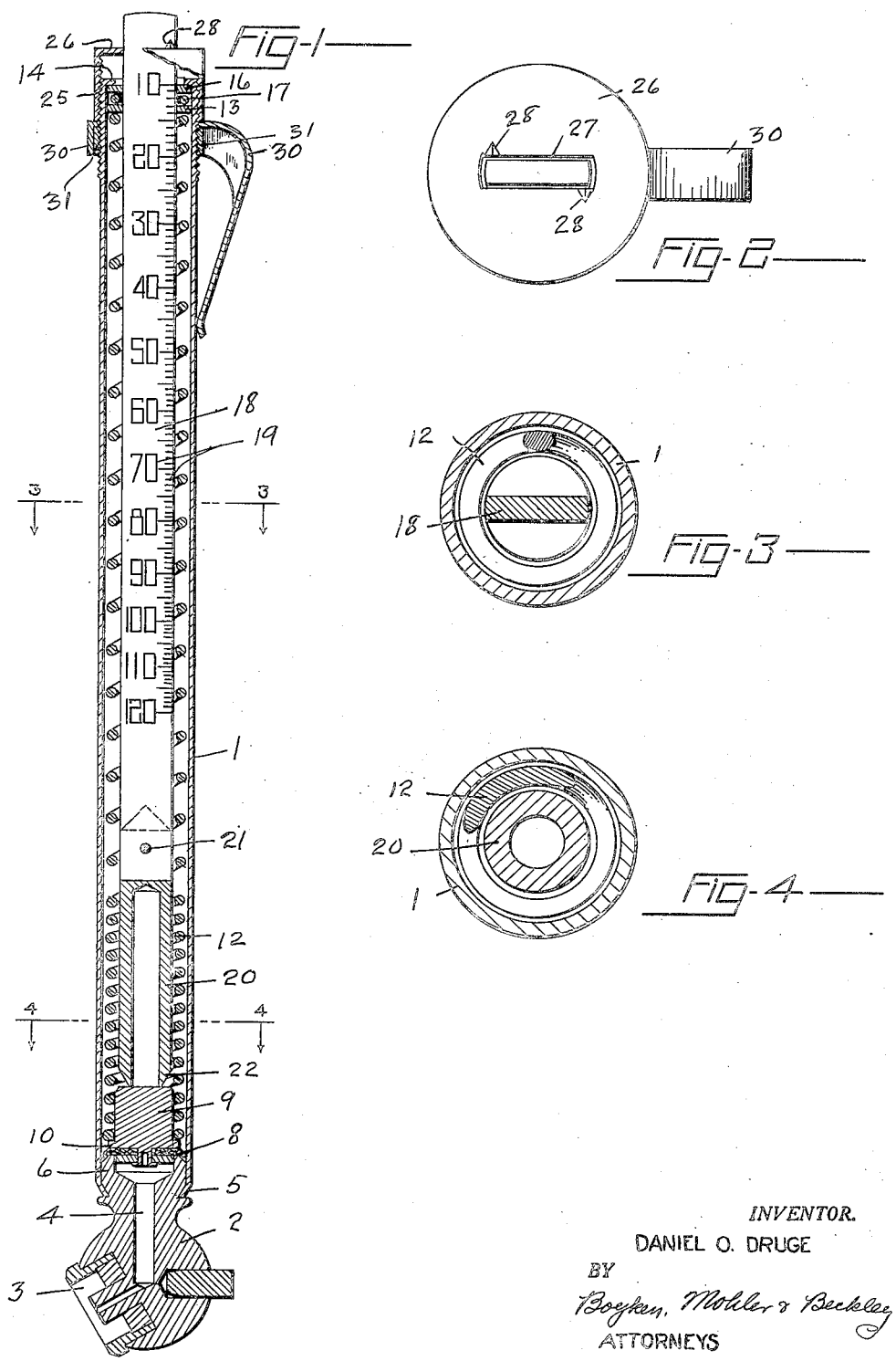
INVENTOR.
DANIEL O. DRUGE
BY
Bogken, Mohler & Beckley
ATTORNEYS Patented Nov. 14, 1950

2,530,005

UNITED STATES PATENT OFFICE 2,530,005

PRESSURE GAUGE

Daniel O. Druge, Oakland, Calif.

Application March 29, 1946, Serial No. 658,114

1 Claim. (Cl. 73—419)

This invention relates to a pressure gauge, such as is used for testing of the air pressure in pneumatic tires.

The principal object of the invention is the provision of a pressure gauge so constructed as to enable the user to readily adjust the same to provide an accurate reading of the pressure.

Another object of the invention is the provision of a tire pressure gauge so constructed that the user may quickly adjust the same without the necessity for disassembling it or using tools, so as to provide accurately setting the gauge for providing accurate readings.

A still further object of the invention is the provision of a tire pressure gauge so constructed as to facilitate its assembly, testing, and adjustment.

It is a well known fact that tire pressure gauges become inaccurate after a certain time, and many times they are incorrectly set at the start, or they may accidentally be misadjusted. Heretofore, attempts have been made to provide for adjusting tire pressure gauges, but these attempts have generally been along lines that require the disassembly of the gauge for making the adjustment or the use of a special tool or both. In most instances the procedure is so tedious, requiring repeated disassembling and assembling of the gauge until the desired adjustment is made, that the user abandons the job or else attempts to reconcile himself to a mediocre adjustment.

By the present invention, the operator can make the desired adjustment within a few seconds, and at the time the gauge is assembled the adjustment can be made during the time the actual air pressure is applied for testing the gauge. In fact the user himself may, if desired, make the adjustment while the air pressure is applied if he desires.

Other objects and advantages will appear in the description and in the drawings, such as the provision of structure facilitating the collapse of the gauge after a reading, and the provision for a clear exposure of the pressure indicating figures and marks during a reading.

In the drawings,

Fig. 1 is a sectional view taken longitudinally through a pressure gauge with certain parts indicated in elevation.

Fig. 2 is an enlarged end elevational view of the gauge of Fig. 1 as seen from the outer, upper end thereof.

Fig. 3 is an enlarged sectional view taken along line 3—3 of Fig. 1.

Fig. 4 is an enlarged sectional view taken along line 4—4 of Fig. 1.

In detail, the gauge illustrated comprises a cylinder 1 provided with a fitting 2 at one end thereof having a chuck 3 adapted to receive a conventional valve stem, and which fitting has an inlet 4 extending between said chuck and the interior of the cylinder at the end of the latter carrying said fitting for admission of air under pressure into said cylinder. The said fitting 2 may be formed with an exterior annular groove into which the end 5 of the cylinder 1 is turned or crimped for securing said fitting to said cylinder. Also a cylindrical portion 6 of said fitting projects into said cylinder and is formed with a tapered end for providing an annular recess between the tapered sides of said end and said cylinder for receiving the cup washer 8 of a piston 9 that is reciprocable in said cylinder when said piston is at one end of its stroke and no air pressure is admitted through inlet 4.

The piston 9 is formed with a slight, radially outwardly projecting flange 10 adjacent said cup washer, and a coil spring 12 reacts between said flange and a washer 13 in the end of the cylinder that is opposite said fitting 2 for yieldably urging said piston to the one end of its stroke adjacent said fitting.

The end of said cylinder 1 opposite fitting 2 is formed with a radially inwardly projecting flange 14 for holding said washer 13 in said cylinder, and between washer 13 and flange 14 is a second washer 16, while a spring friction member 17 is between washers 13, 16 for a purpose to be later described more in detail.

An elongated pressure indicating element 18 is within said cylinder 1 and extends longitudinally and coaxially thereof. The said element 18 is preferably flattened (Figs. 2 to 4) for the major portion of its length, and carries pressure indicating numbers and marks 19 on its flat sides. Said element extends through the washers 13, 16 and friction member 17 and projects outwardly of the end of the cylinder 1 beyond flange 14.

The end portion 20 of element 18 that is adjacent piston 9 is preferably cylindrical and is secured to the flat major portion of said element by a pin 21. The said portion 20 terminates in a tapered end 22 that engages the piston 9. As the portion 20 is preferably only slightly smaller in diameter than the inside diameter of the coil spring 12, the tapered end 22 prevents the end of said portion 20 from bumping or engaging the coils of the spring when the element 18 is pushed toward piston 9 and into engagement with the latter after the said element has been moved by the piston to an extended position for taking a reading of the pressure.

The coil spring 12 is preferably more tightly coiled at its end that is adjacent the piston 9 than the remainder of said coil. This multiple pitch in spring 12 permits a wide graduation at low pressures and a relatively wide graduation in the higher pressures without making separate springs.

The exterior of the cylinder 1 at the end thereof through which the pressure indicating element 18 extends, is threaded for threaded engagement with the interior threads on the annular flange 25 of a cap having a head 26 that is formed with a slot 27 (Fig. 2) through which the element 18 freely extends. The outline of slot 27 substantially corresponds to the cross-sectional outline of the element 18. Thus element 18 will not turn or rotate in the slot.

Projecting from the head 26 alongside the graduations 19 at each side of element 18 is an indication or pointer 28. The point of this indication defines the reading point on the pressure indicating element 18. By this arrangement substantially the major part of each numeral is exposed for reading, and the graduation identified by said pointer is entirely exposed.

This indicator device is movable longitudinally of the cylinder 1 upon rotation thereof, thus the pointers 28 thereon will change their positions relative to the graduations 19 on element 1 upon said movement.

A pen or pencil clip 30 may embrace the cylinder 1 between the flange or sleeve 25 and a lock nut or ring 31 that is also threaded onto the cylinder 1.

The spring member 17 that surrounds the element 18 is in frictional engagement with said element. Thus when the air under pressure is admitted into the cylinder 1 through inlet 4, the movement of the piston 9 toward the outer end of the cylinder will push the element 18 outwardly of said outer end and the graduations on element 18 will move past the pointers or indicators 28. When the piston stops, the graduation even with the point of either indicator 28 will indicate the pressure of the air. If the fitting 2 is removed from the valve stem, the element 18 will nevertheless stay in extended position, even though the piston 9 returns to the end of the cylinder adjacent fitting 2. After reading the graduation, or pressure, the element 18 is pushed back to collapsed position ready for another reading.

Assuming that the recorded or indicated pressure on a particular reading is 25 lbs. but the actual pressure is known to be 30 lbs. the operator may quickly loosen the lock nut and move the cap to the point where the indicator will read 30 lbs., thus correcting the error. This adjustment of the cap at the time of the initial testing of the gauge at the factory also facilitates the work of setting the gauge. No special equipment is necessary nor is it necessary to disassemble the gauge. The adjustment can be made when the pressure is against piston 9 or when the gauge is disconnected from air pressure, as desired.

It is also pertinent to note that the cap 26 is outwardly of the end of the cylinder 1 and is independent of the spring 12, which is essential to accuracy.

It is to be understood that the detailed description and drawings are not to be considered restrictive of the invention, but are merely illustrative thereof.

I claim:

A pressure gauge comprising a cylinder having an air inlet at one end, a piston in said cylinder, a coil spring extending between the opposite end of said cylinder and said piston tending to move said piston toward said inlet, an elongated pressure indicating element extending through said spring coaxial therewith and through the said opposite end of said cylinder and provided with spaced pressure indicating marks on a side thereof, an indicator carried on said opposite end of said cylinder and projecting outwardly of said opposite end cooperating with said element and marks for indicating the mark on said element to be read, said indicator being movable longitudinally of said element independently of said spring and piston for varying its position relative to said marks and locking means for releasably securing said indicator in adjusted position, said element including a cylindrical end portion adjacent said piston formed with a tapered end engageable with said piston, said element including said end portion being separable from said piston, and friction means in said cylinder for frictionally holding said element in extended position upon movement of said piston toward said inlet, said cylindrical end portion being only slightly less in diameter than the diameter of said spring.

DANIEL O. DRUGE.

REFERENCES CITED

The following references are of record in the file of this patent:

UNITED STATES PATENTS

| Number | Name | Date |
|---|---|---|
| 1,438,798 | Walker | Dec. 12, 1922 |
| 1,602,822 | Kraft | Oct. 12, 1926 |
| 1,774,153 | Pfeiffer | Aug. 26, 1930 |
| 2,050,084 | Carliss | Aug. 4, 1936 |